United States Patent
Kawashima et al.

(10) Patent No.: US 7,437,910 B2
(45) Date of Patent: Oct. 21, 2008

(54) PRESSURE DIFFERENTIATOR FITTED WITH A TEMPERATURE EQUALIZING MATERIAL

(75) Inventors: Kenji Kawashima, Yokohama (JP); Toshiharu Kagawa, Yokohama (JP)

(73) Assignee: Tokyo Institute of Technology, Meguro-Ku, Tokyo (JP)

( * ) Notice: Subject to any disclaimer, the term of this patent is extended or adjusted under 35 U.S.C. 154(b) by 0 days.

(21) Appl. No.: 10/569,197

(22) PCT Filed: Mar. 29, 2004

(86) PCT No.: PCT/JP2004/004398

§ 371 (c)(1),
(2), (4) Date: Feb. 23, 2006

(87) PCT Pub. No.: WO2005/019787

PCT Pub. Date: Mar. 3, 2005

(65) Prior Publication Data

US 2006/0288790 A1    Dec. 28, 2006

(30) Foreign Application Priority Data

Aug. 26, 2003 (JP) ............................. 2003-301734

(51) Int. Cl.
G01M 3/20 (2006.01)
G01M 3/02 (2006.01)
G01L 15/00 (2006.01)
(52) U.S. Cl. .................. 73/36; 73/37; 73/715; 73/716
(58) Field of Classification Search ........... 73/700–756, 73/36, 37; 361/283.1–283.4
See application file for complete search history.

(56) References Cited

U.S. PATENT DOCUMENTS 2,850,901 A * 9/1958 Proctor ....................... 73/736

(Continued)

FOREIGN PATENT DOCUMENTS

JP          35-17394 Y       7/1960

(Continued)

OTHER PUBLICATIONS

Ernest O. Doebelin. Measurement Systems, McGran-Hill, 1976, p. 888.

(Continued)

*Primary Examiner*—Andre J. Allen
*Assistant Examiner*—Jermaine Jenkins
(74) *Attorney, Agent, or Firm*—Millen, White, Zelano & Branigan, P.C.

(57) ABSTRACT

An object of the invention is to provide a pressure differentiator capable of improving measurement accuracy.

The pressure differentiator of the invention includes an isothermal pressure vessel 1, a narrow tube 3 for connecting an object to be measured to the inside of the vessel 1, and a differential manometer 2 for calculating a differential pressure between the object and the inside of the vessel 1. It is preferable that a flow through the narrow tube 3 during measurement is a laminar flow. The isothermal pressure vessel 1 is fitted with a temperature equalizing material. As the temperature equalizing material, thin metal wires may be used. When the pressure $P_s$ to be measured within a vessel positioned below is changed, the pressure $P_c$ within the isothermal pressure vessel 1 is changed, with a slight lag, through the narrow tube 3. By measuring the differential pressure $P_j$ ($=P_s-P_c$) at that time, using a diaphragm-type pressure differentiator, the derivative value of the pressure $P_s$ may be calculated.

16 Claims, 5 Drawing Sheets

U.S. PATENT DOCUMENTS

| | | | |
|---|---|---|---|
| 4,567,761 A * | 2/1986 | Fajeau | 73/290 R |
| 4,869,104 A * | 9/1989 | Saito et al. | 73/299 |
| 5,305,638 A * | 4/1994 | Saghatchi et al. | 73/202 |
| 6,510,740 B1 * | 1/2003 | Behm et al. | 73/708 |

FOREIGN PATENT DOCUMENTS

| | | | |
|---|---|---|---|
| JP | 41-14311 Y | | 7/1966 |
| JP | 45-11101 Y | | 5/1970 |
| JP | 48-12778 A | | 2/1973 |
| JP | 02-256122 | | 10/1990 |
| JP | 2003-65814 A | | 3/2003 |
| JP | 2003065814 A | * | 3/2003 |

OTHER PUBLICATIONS

Kawashima, et al.: "Flow Rate Measurement of Compressible Fluid Using Pressure Change in the Chamber." Journal of the Society of Instrucment and Control Engineers (SICE), vol. 32, No. 11, 1996, pp. 1485-1492.

Kawashima, et al.: "Instantaneous Flow Rate Measurement of Ideal Gases." Trans. ASME Journal of Dynamic Systems, Measurement and Control. vol. 122, 2000, pp. 174-178.

Kagawa, et al.: Nondimensional Pressure Responses of Pneumatic RC Circuits Considering Heat Transfer, Hydraulics and Pneumatics, vol. 19, No. 4, 1988, pp. 54-59.

M. Yasuda: "Active Microvibratory Control by Pneumatic Pressure." Journal of the Japan Hydraulics, vol. 31, No. 5, 2000, pp. 14-19.

Certified Translation of Final Rejection—JP 2004224155 dated Jun. 28, 2007 by METI Administrative Officer: Emiko Hirase.

Patent Abstracts Of Japan—Publication No. 02-256122 "Impact Pressure Relay", Mitsubishi Electric Corp.

* cited by examiner

PRESSURE DIFFERENTIATOR FITTED WITH A TEMPERATURE EQUALIZING MATERIAL

TECHNICAL FIELD

This invention relates to a pressure differentiator.

BACKGROUND ART

In a pneumatic control system, it is necessary to measure an output signal of a possible high order, in order to perform an accurate and rapid control. To this end, when the pressure within a vessel is to be controlled by a pneumatic servovalve, for example, an advanced derivative control (D-PI control) is often used, in which the pressure within the vessel is measured by a pressure sensor and a signal obtained by differentiating an output signal from the sensor using a differentiator is fed back as a minor loop.

Many methods in which a high-order signal is estimated by a low-order signal, as described above, have been suggested. However, it is ideal that an actual value of the high-order output signal may be directly measured by a sensor. This is because the estimation is not easy because of an affect of a sensor noise and, further, a derivative of the pressure cannot be correctly detected when a pressure change is too small and below the resolving power of the sensor.

In relation to a pressure differentiator, a method for measuring a differential pressure has been suggested. (For example, see Ernest O. Doebelin. Measurement Systems, McGran-Hill, (1976).) In other words, as a method for directly measuring a derivative of the pressure, a method for detecting a differential pressure between two sections by using a diaphragm has been suggested. This method utilizes a phenomenon in which the displacement of the diaphragm becomes a first order lag system for the pressure when pressurization of one of the sections is carried out through a capillary tube. This configuration has been used in an altimeter of an aircraft.

On the other hand, an isothermal pressure vessel has been developed. (For example, see K. Kawashima, T. Fujita, T. Kagawa: Measurement Method of Flow Rate Using Pressure Change in Vessel, Journal of the Society of Instrument and Control Engineers (SICE), Vol. 32, No. 11, 1485/1492, (1996); and K. Kawashima, T. Kagawa, T. Fujita: Instantaneous Flow Rate Measurement of Ideal Gases. Trans. ASME Journal of Dynamic Systems, Measurement and Control, Vol. 122, pp. 174-178, (2000).)

DISCLOSURE OF THE INVENTION

The above method using the diaphragm has a problem that a measurement accuracy of the method is low and the method cannot be used for measuring a steep pressure change.

An object of the present invention is to resolve such a problem and to provide a pressure differentiator by which the measurement accuracy may be improved.

A pressure differentiator according to the invention has a vessel, a hollow channel for connecting an object to be measured to the inside of the vessel, and a differential manometer for calculating a differential pressure between the object and the vessel.

At this point, a flow through the hollow channel during measurement may be a laminar flow. The vessel may be an isothermal pressure vessel. The vessel may be filled up with a temperature equalizing material. Thin metal wires may be used as the temperature equalizing material. Further, a diaphragm-type differential manometer may be used as the differential manometer.

This invention produces the following effects.

As the pressure differentiator of the invention has a vessel, a hollow channel for connecting the inside of the vessel to the object to be measured, and a differential manometer for calculating the differential pressure between the object and the vessel, the measurement accuracy may be improved.

BEST MODE FOR CARRYING OUT THE INVENTION

A best mode for carrying out the invention in relation to a pressure differentiator is described below.

First, a configuration and a measurement principle of the pressure differentiator proposed by the invention are explained. Next, an efficiency of the pressure differentiator is inspected by a simulation. Further, by experiment, an output signal of the pressure differentiator is compared to a derivative of pressure obtained by simultaneously differentiating an output signal of a manometer. Finally, an advantage of the proposed pressure differentiator is inspected by comparing the output signal of the pressure differentiator with an output signal obtained by using an empty pressure vessel having no copper wire therein.

Major notations used in the embodiment are listed below.

Major Notations $A_h$: heating area of wall surface of pressure vessel, [m³];
$C_p$: specific heat of air at constant pressure, $1.004 \times 10^3$ [J/(kg K)];
$C_v$: specific heat of air at constant volume, $0.716 \times 10^3$ [J/(kg K)];
dv: inner diameter of manufactured pressure vessel, [m];
G: mass flow, [kg/s];
$G_{do}$: output gain of proposed sensor;
$h_u$: heat transfer coefficient (when air flows into pressure vessel), [W/(m² K)];
$h_e$: heat transfer coefficient (when air flows out from pressure vessel), [W/(m² K)];
$H_v$: height of manufactured pressure vessel, [m];

k: proportionality coefficient between output signal $P_j$ and displacement $x_0$ of diaphragm-type differential manometer, $P_j/x_0$ [Pa/m];

L: length of narrow tube, [m];

$P_s$: pressure of object to be measured, [Pa abs];

$P_c$: pressure within pressure vessel, [Pa abs];

$P_j$: output signal of diaphragm-type differential manometer, [Pa];

Q: volume flow at normal state, [m³/s];

R: gas constant of air, 287.03 [J/(kg K)];

r: radius of narrow tube, [m];

Re: Reynolds number;

st: sampling time, [s];

$P_{do}$: output of proposed pressure differentiator;

T: time constant of pressure within pressure vessel, [s];

$T_c$: cutoff cycle, [s];

$T_{se}$: thermal equilibrium time constant, [s];

V: volume of pressure vessel, [m³];

W: mass of air in pressure vessel, [kg];

θ: temperature in pressure vessel, [K];

$θ_a$: outside air temperature, 293.15 [K];

$x_0$: displacement of diaphragm of differential manometer, [m];

μ: viscosity, [Pa s];

$ρ_a$: density of air at atmospheric pressure, [kg/m³];

κ: specific heat of air, 1.4

Figure 1:
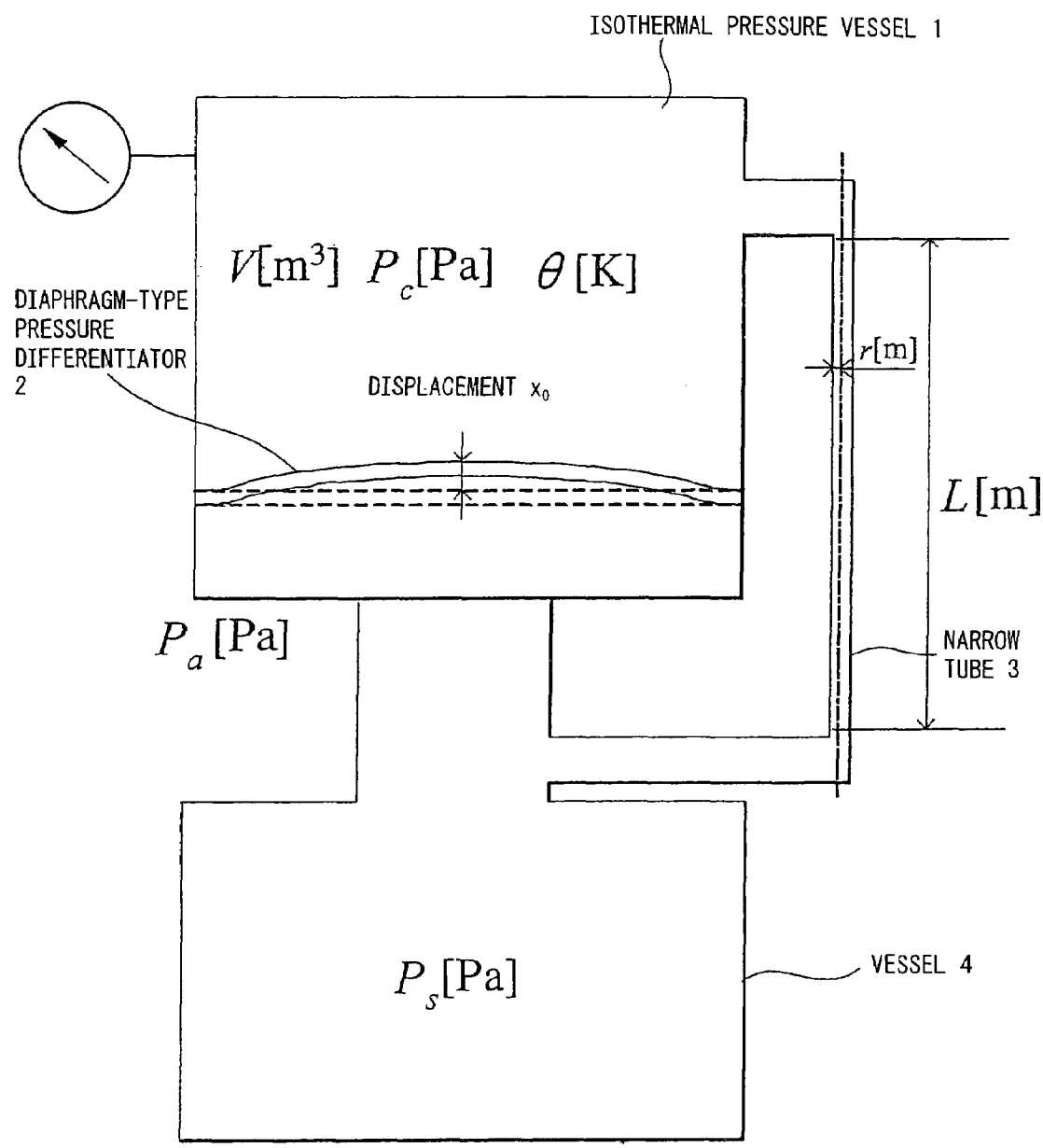
FIG. 1 is a schematic diagram of a pressure differentiator proposed by the invention.

FIG. 1 is a schematic diagram of a pressure differentiator according to the embodiment.

The pressure differentiator has a vessel, a hollow channel for connecting the inside of the vessel to an object to be measured, and a differential manometer for calculating a differential pressure between the object and the vessel.

As the vessel, an isothermal pressure vessel 1 may be used. The vessel 1 is filled up with a temperature equalizing material. As the material, thin metal wires may be used, for example.

As the thin metal wires, thin copper wires may be used, for example. The thin metal wires are not limited to the copper wires. Thin iron, aluminum or stainless wires, cotton or nylon may be used. In other words, a fibrous material, having a diameter within a range of 10-50 μm and a thermal conductivity larger than 0.05 W/(m K), may be used.

A volume ratio of the temperature equalizing material relative to the volume of the isothermal pressure vessel is preferably within a range of 3-15%. When the volume ratio is equal to or larger than 3%, an almost isothermal change may be advantageously achieved. When the volume ratio is equal to or less than 15%, the pressure is equally distributed in the vessel, whereby it would not be a problem to measure the pressure anywhere in the vessel.

Preferably, the volume of the isothermal pressure vessel is within a range of $1.0 \times 10^{-8} - 1.0 \times 10^{-4}$ m³. When the volume is equal to or larger than $1.0 \times 10^{-8}$ m³, the vessel is easy to manufacture. When the volume is equal to or less than $1.0 \times 10^{-4}$ m³, measurement with a fast-response may be possible.

One available object to be measured by the pressure differentiator is air. The object to be measured is not limited to air. Any gas, such as nitrogen, hydrogen or carbon dioxide, is possible.

A narrow tube 3 is a hollow channel for communicating the object to be measured with the inside of the isothermal pressure vessel.

An inner radius of the narrow tube is preferably within a range of 0.00001-0.001 m. When the radius is equal to or longer 0.00001 m, the constitution of the pressure differentiator is advantageously simple. When the radius is equal to or less than 0.001 m, it is easy to form a laminar flow.

The length of the narrow tube is preferably within a range of 20-500 mm. When the length is equal to or longer than 20 mm, an effect of pressure loss in an entrance region may be advantageously reduced. When the length is equal to or shorter than 500 mm, the pressure differentiator with a high-response may be obtained.

Preferably, a flow within the narrow tube during measurement is a laminar flow. This is because the pressure is proportional to the flow rate and the pressure differentiator according to the invention may be constituted.

A differential manometer is used to calculate a differential pressure between the object to be measured and the inside of the pressure vessel. As the differential manometer, a diaphragm-type differential manometer may be used. The differential manometer is not limited to the diaphragm-type. Any differential manometer, such as one using a bellows, may be used.

In FIG. 1, when the pressure $P_s$ to be measured within a vessel positioned below is changed, the pressure $P_c$ within the isothermal pressure vessel is changed, with a slight lag, through the narrow tube. By measuring the differential pressure $P_j (=P_s-P_c)$ at that time, using the diaphragm-type pressure differentiator, the derivative value of the pressure $P_s$ may be calculated.

A measurement principle of the pressure differentiator of the embodiment is explained below.

Assuming that the flow within the narrow tube is the laminar flow, according to an energy equation and the Hagen-Poiseuille law[1], a relational expression of the change of the supply pressure $P_s$ and the displacement of the diaphragm may be represented below.

State Equation of Gas $$P_c V = WRθ \quad (1)$$

By the total differentiation of the above state equation, an equation below is obtained.

$$P_c \frac{dV}{dt} + \frac{dP_c}{dt}V = GRθ + WR\frac{dθ}{dt} \quad (2)$$

Assuming that the pressure is isovolumetrically and isothermally changed, an equation below is true.

$$G = \frac{V}{Rθ}\frac{dP_c}{dt} \quad (3)$$

This indicates that the value G may be calculated by differentiating the value $P_c$ when an initial temperature θ in the vessel and the gas constant R are previously known, in the case of the isothermal vessel in which the thin metal wires are fitted (See K. Kawashima, T. Kagawa, T. Fujita: Instantaneous Flow Rate Measurement of Ideal Gases. Trans. ASME Journal of Dynamic Systems, Measurement and Control, Vol. 122, pp. 174-178, (2000)). According to past studies, an empty vessel and an isothermal vessel, including thin metal wires each having the average diameter of 25 μm and having the density of 310 kg/m³, have been used for an experiment in which air is charged or discharged. It has been reported that when the changes of temperature in the vessels is compared to each other, only several Kelvin has been changed in the isothermal vessel, although about 40 Kelvin has been changed in the empty vessel (See K. Kawashima, T. Kagawa, T. Fujita: Instantaneous Flow Rate Measurement of Ideal Gases. Trans.

ASME Journal of Dynamic Systems, Measurement and Control, Vol. 122, pp. 174-178, (2000)).

$$Q = \frac{\pi r^4}{8\mu L}\Delta p \text{ (wherein Re} \leq 2000) \tag{4}$$

By using an equation of Hagen-Poiseuille law[1], as described above, the volume flow Q into the vessel, through the narrow tube having the radius r, is represented as below.

$$Q = \frac{\pi r^4}{8\mu L}(P_s - P_c) \tag{5}$$

When the density of air at atmospheric pressure $\rho a$ (=1.205 [kg/m³]) and the pressure $P_c$ are taken into account, the mass flow G is represented as below.

$$G = \rho_a \frac{P_c}{P_a} Q = \frac{\rho_a P_c \pi r^4}{P_a 8\mu L}(P_s - P_c) \tag{6}$$

$$r_s = \frac{P_a 8\mu L}{\rho_a \pi r^4}$$

At this point, when a value $r_s$ as indicated above is set as a resistance coefficient of the flow in the tube, the equation (6) may be rewritten as below.

$$G = \frac{P_c}{r_s}(P_s - P_c) \tag{7}$$

Further, regarding the displacement $x_0$ of the diaphragm, equations below are true by using a spring constant k.

$$\frac{X_o}{k} = P_j = P_s - P_c \tag{8}$$

$$P_c = P_s - P_j \tag{9}$$

By the equations (3), (7) and (8), an equation below is obtained.

$$\frac{d}{dt}(P_s - P_j) = \frac{P_c P_j}{r_s} \frac{R\theta}{V} \tag{10}$$

$$K = \frac{R\theta}{r_s V}$$

At this point, when a value K is defined as represented above and an equation (10) is Laplace transformed, an equation below is true.

$$sP_s - P_s(0) - sP_j + P_j(0) = KP_j P_c \tag{11}$$

$$P_j(0) = 0$$

When an equation as described above is sequentially transformed, an equation below is obtained.

$$P_j = \frac{\frac{1}{P_c K}}{1 + \left(\frac{1}{P_c K}\right)s} \cdot \{sP_s - P_s(0)\} \tag{13}$$

An equation below is true.

$$sP_s - P_s(0) = \mathcal{L}\left(\frac{dP_s}{dt}\right)$$

Further, as the value $P_c(t)$ may be measured by means of the manometer, by the correction using the value $P_c(t)$, the output of the pressure differentiator of the invention is represented below. Due to an equation (14), it is understood that a first order lag relation is established between the output $P_j$ of the pressure differentiator and the supply pressure $P_s$.

$$P_{do} = P_c P_j = \frac{\frac{1}{K}}{1 + \left(\frac{1}{P_c K}\right)s} \cdot \mathcal{L}\left(\frac{dP_s}{dt}\right) \tag{14}$$

Assuming that the inside of the vessel is isothermal, the value K is constant. Therefore, the output gain of the pressure differentiator as represented below is also constant.

$$G_{do} = \frac{1}{K} = \frac{P_a 8\mu LV}{\rho_a \pi r^4 R\theta} \tag{15}$$

In a region in which $P_c \geq P_a$ is true, a time constant as represented below becomes smaller as the inside of vessel is pressurized. By an equation (16), it is necessary to reduce the length L of the narrow tube and the volume V of the vessel as possible, in order to lower the response time constant.

$$T = \frac{1}{P_c K} = \frac{P_a 8\mu LV}{P_c \rho_a \pi r^4 R\theta} \tag{16}$$

When the differential pressure is calculated by measuring the values $P_s$ and $P_c$ using respective sensors, without using the diaphragm differential manometer, the measurement is very difficult, because the differential pressure is too small and below the resolving power of the manometer.

A response simulation of the pressure differentiator of the embodiment is explained below.

A response of the pressure differentiator utilizing the principle of the isothermal pressure vessel is compared to a response of a sensor used for an empty vessel as the pressure vessel, by means of a simulation of SIMULINK, in order to inspect a theoretical effectiveness of the pressure differentiator.

A theoretical equation used in the simulation is explained.

In the simulation, the mass flow G is calculated by the equation (6). A total differential formula of the state equation of gas in the pressure vessel is represented by the equation (3) in the case of the proposed pressure differentiator and by the equation (17) in the case of the empty vessel used as the pressure vessel. Also, when the empty vessel is used, an energy equation including heat transfer in relation to the wall surface is represented by an equation (18-1) when charging air and by an equation (18-2) when discharging air.

$$\frac{dP_c}{dt} = \frac{P_c}{\theta}\frac{d\theta}{dt} + \frac{R\theta}{V}G \qquad (17)$$

when charging $$\frac{d\theta}{dt} = \frac{R\theta}{C_v P_c V}[G_u(C_p\theta_a - C_v\theta) + h_u S_h(\theta_a - \theta)] \qquad (18\text{-}1)$$

when discharging $$\frac{d\theta}{dt} = \frac{R\theta}{C_v P_c V}[RG_e\theta + h_u S_h(\theta_a - \theta)] \qquad (18\text{-}2)$$

Parameters and a procedure of the simulation is explained.
Values of the parameters used in the simulation are listed below:
V: $4 \times 10^{-5}$ m$^3$;
Shape of vessel: assumed as sphere shape having radius of 21.216 mm;
$S_h$: $4\pi r_1^2 = 0.56564$ m$^2$;
θ: assumed as an isothermal model and a non-isothermal model;
r: 0.00075 m;
L: 150 mm;
$h_u$: 50 W/(m$^2$ K)$^{2)}$;
$h_e$: 40 W/(m$^2$ K)$^{2)}$ In the simulation, an initial value of the value $P_s$ is assumed to be equal to an atmospheric pressure (101.3 kPa). The pressure is raised after 1 second from the beginning of the simulation, according to a waveform of first order lag having a time constant T of 0.6 second and, then, the pressure is kept at a constant value. After that, i.e., after 6 seconds from the beginning of the simulation, the pressure is returned to the atmospheric pressure according to a waveform of first order lag having a time constant T of 1 second. The maximum value of the supply pressure is 252 kPa.

The response time constant T of the pressure differentiator is obtained as below, by assigning the above parameters into the equation (15).

$T=0.00862 s-0.003465 s$

Theoretically, a response frequency of the pressure differentiator is equal to or larger than 100 Hz.

Figure 2:
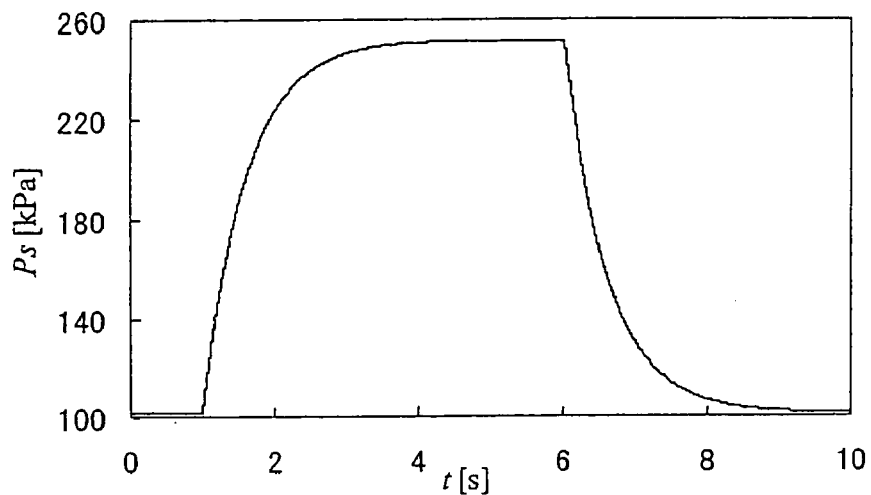
FIG. 2 is a graph indicating the change of a waveform of the pressure $P_s$ in a simulation.

A waveform indicating of the change of the value $P_s$ in the simulation is shown in FIG. 2.

A result of the simulation is explained below.

Figure 3:
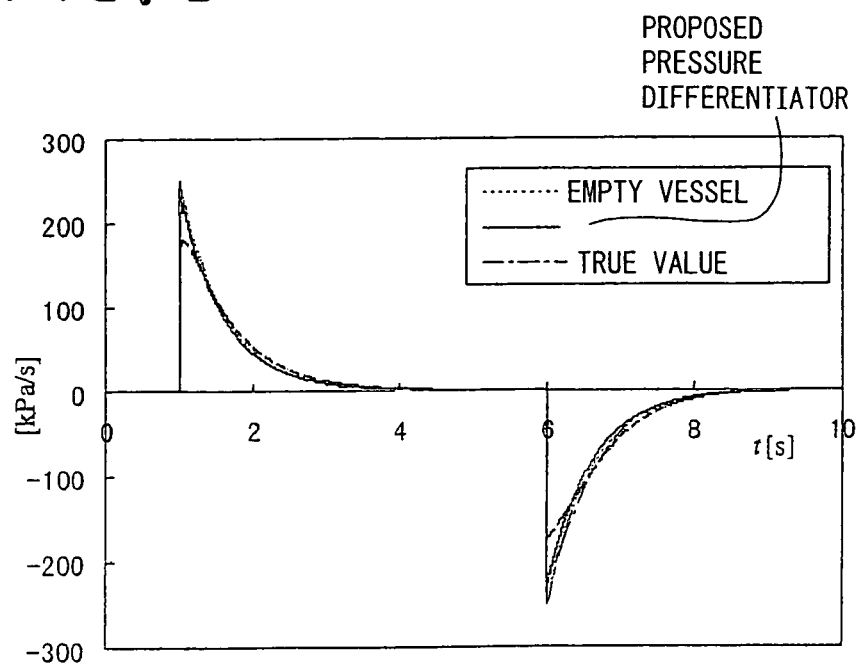
FIG. 3 is a graph indicating a result of a simulation in which the proposed pressure differentiator and a pressure differentiator with an empty vessel are used.

FIG. 3 indicates the result of the simulation in the case of the proposed pressure differentiator and in case that the empty vessel is used as the pressure vessel. As shown in FIG. 3, it is understood that the pressure follows a true value without lag when the proposed pressure differentiator is used, on the other hand, the response of pressure delays when the empty vessel is used. Also, a simulation in which the maximum value of the value $P_s$ is changed carried out. In the case of the empty vessel, as the temperature θ in the vessel is changed when the pressure in the vessel is changed, the output gain $G_{do}$ of the differential pressure sensor is also changed. As a result, when the maximum value of the value $P_s$ is changed, for example, an error of the derivative value from the true value becomes larger. On the other hand, in the case that the isothermal pressure vessel is used, such a tendency is not observed.

Figure 4:
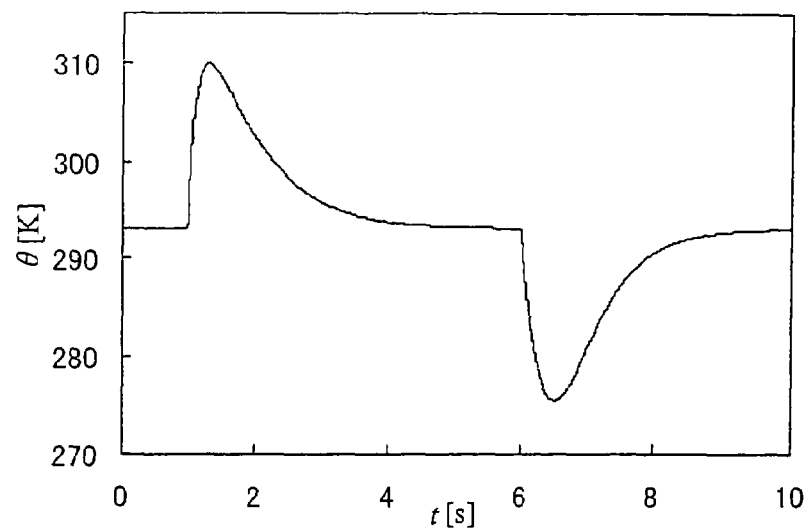
FIG. 4 is a graph indicating a result of a simulation of the temperature change in the empty vessel.

FIG. 4 shows a result of a simulation in which the temperature in the empty vessel is varied. As shown in FIG. 4, it can be seen that, when the empty vessel is used, the temperature θ in the vessel is varied between 275K and 310K. The output gain $G_{do}$ of the sensor calculated by using the equation (15) is between 825.77(θ=310K) and 930.87(θ=275K). Therefore, the output gain $G_{do}$ may be varied within about 13%.

It can be understood that, from the result of FIG. 3, a phase lag occurs in the case of the empty vessel. This is because that the derivative value of the pressure is calculated by a theoretical equation which ignores the temperature change actually caused in the empty vessel. In other words, in the case of the empty vessel, a transfer function of the flow rate and the pressure change in the vessel when discharging may be calculated as below, by Laplace transform of the total differential formula of the state equation (17) and the energy equation (18-2).

$$G = \frac{V}{R\theta}\frac{T_{se}s + 1}{\kappa T_{se}s + 1}\frac{dP_c}{dt} \qquad (19)$$

wherein:

$$T_{se} = \frac{C_v W}{hs}$$

The value $T_{se}$ is so called a time constant of thermal equilibrium[2)]. By the equation (19), a phase lag system is represented between the pressure change and the flow rate. Therefore, in comparison with the relational equation (1) indicating the pressure change and the flow rate G in the case of the isothermal pressure vessel, the phase lag occurs in the case of the empty vessel.

Due to the above simulation results, a theoretical effectiveness of the proposed pressure differentiator is indicated.

The manufacture and an experiment of the pressure differentiator are described below.

The pressure differentiator was actually manufactured and an experiment in which a changeable waveform was applied to the pressure $P_s$ was carried out, in order to demonstrate the effectiveness of the pressure differentiator.

The specification of the manufactured pressure differentiator is below:
shape of pressure differentiator: cylindrical (diameter $d_v$=50 mm, height $H_v$=20 mm)

$$V: \frac{\pi}{4}d_v^2 \times H_v = 3.927 \times 10^{-5} m^3;$$

r: 0.00075 m;
L: length of narrow tube=150 mm;
pressure sensor for measuring $P_a$ and $P_c$: Omron E8EB10C;
diaphragm type pressure sensor for measuring $P_j$: self-produced;
temperature equalizing material: copper thin wires having weight of 14.4 g, each having diameter of 25 μm (volume ratio 4.24%, length 3391.4 m, heat transfer area 0.2664 m$^2$)

The procedure of the experiment is described below.

First, the initial value of $P_s$ was assumed to be an atmospheric pressure (101.3 kPa). After about two seconds from the beginning of the experiment, the pressure $P_s$ was raised by stepwisely applying input current to a three-port nozzle-flapper type servovalve and, then, the pressure was kept at a constant value. After seven seconds from the beginning of the experiment, the pressure was returned to the atmospheric pressure.

Figure 5:
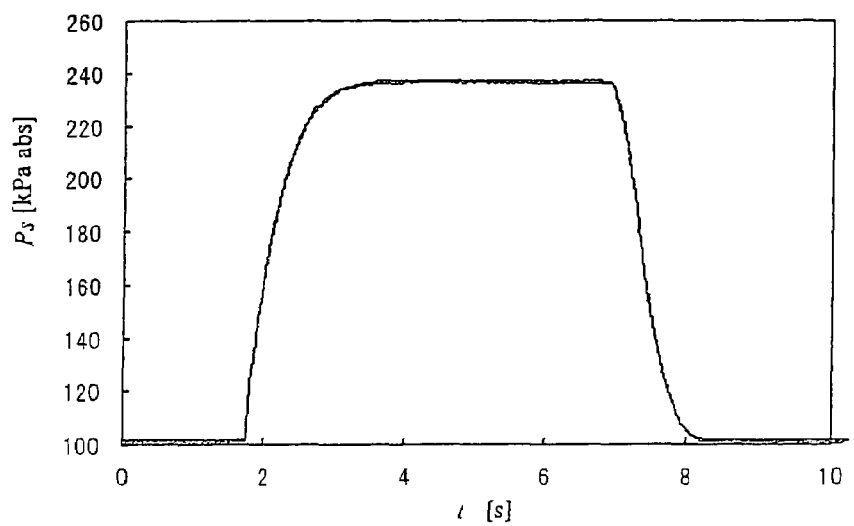
FIG. 5 is a graph indicating the change of a waveform of the pressure $P_s$ in an experiment.

As the servovalve, a patented P075-221 was used. This servovalve was constituted from a nozzle and a flapper and configured to control the flow rate from the nozzle by displacing the flapper. A sampling period st of data by a personal computer (PC) was 0.01s. A maximum value of the supply pressure was 252 kPa. FIG. 5 shows the waveform indicating the change of $P_s$ in the experiment. In FIG. 5, the waveform of $P_s$ generally represents a first order lag system in which the time constant T is approximately equal to 0.6 second. This result depended on the characteristic of the three-port nozzle-flapper type servovalve used in the experiment[3].

In the experiments, experiments regarding three cases were carried out and results thereof were compared to each other. In the three cases; (1) the proposed pressure differentiator with the isothermal pressure vessel was used, (2) a manometer for measuring $P_s$ was used and a simultaneous differentiation of the measured $P_s$ was performed, and (3) the pressure differentiator with the empty vessel was used.

In addition, an equation below was used for calculating a simultaneous differential value of the manometer.

$$\frac{dP_s[i]}{dt} = \frac{1+\exp(-st/T_c)}{2T_c}(P_s[i] - P_s[i-1]) + \frac{dP_s[i-1]}{dt}\exp(-st/T_c) \quad (20)$$

wherein $st = 0.01s$ and $T_c = 0.01s$.

The results of the above experiments are described below.

Figure 6:
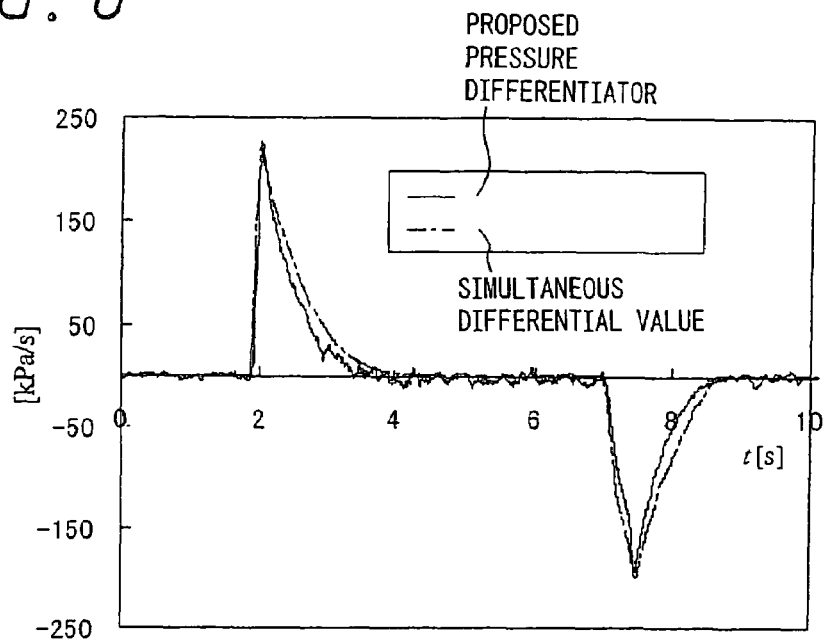
FIG. 6 is a graph indicating an experimental result of the proposed pressure differentiator and indicating the simultaneous differentiation value of the pressure $P_s$.

First, the comparison between the output of the pressure differentiator and the simultaneous differential value is explained. FIG. 6 shows the comparison between the results of cases (1) and (2). As shown in FIG. 6, it can be seen that the pressure differentiator of the invention could follow the change of the pressure without lag, in comparison to the simultaneous differential value of $P_s$ measured by the pressure sensor. The graph of case (1) appears to proceed somewhat at a quicker pace than the graph of case (2), while the raised or lowered pressure was gradually returned. This is because, from a speculation by a measurement result of the static characteristic of the diaphragm, the characteristic of the used diaphragm type differential manometer under pressure was not sufficient.

Figure 7:
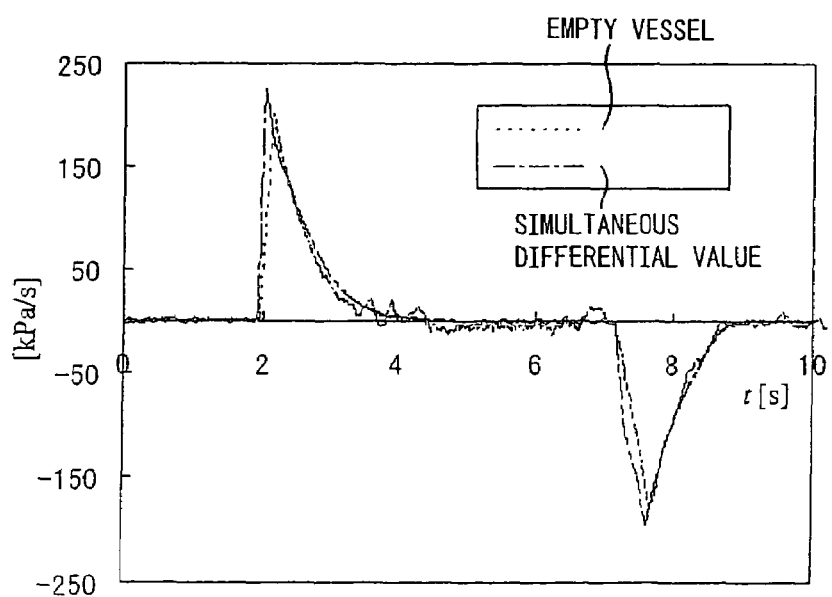
FIG. 7 is a graph indicating an experimental result of the pressure differentiator with the empty vessel and indicating the simultaneous differentiation value of the pressure $P_s$.

Next, the comparison between the case using the empty vessel and the simultaneous differential value is explained. FIG. 7 shows the comparison between the results of cases (2) and (3). The result of FIG. 7 indicates the similar tendency to the simulation result of FIG. 3. It can be seen that, in case (3) in which the empty vessel was used as the pressure vessel, an output amplitude was somewhat smaller than that in case (2) and the phase of the amplitude delayed in comparison to that in case (2).

Figure 8:
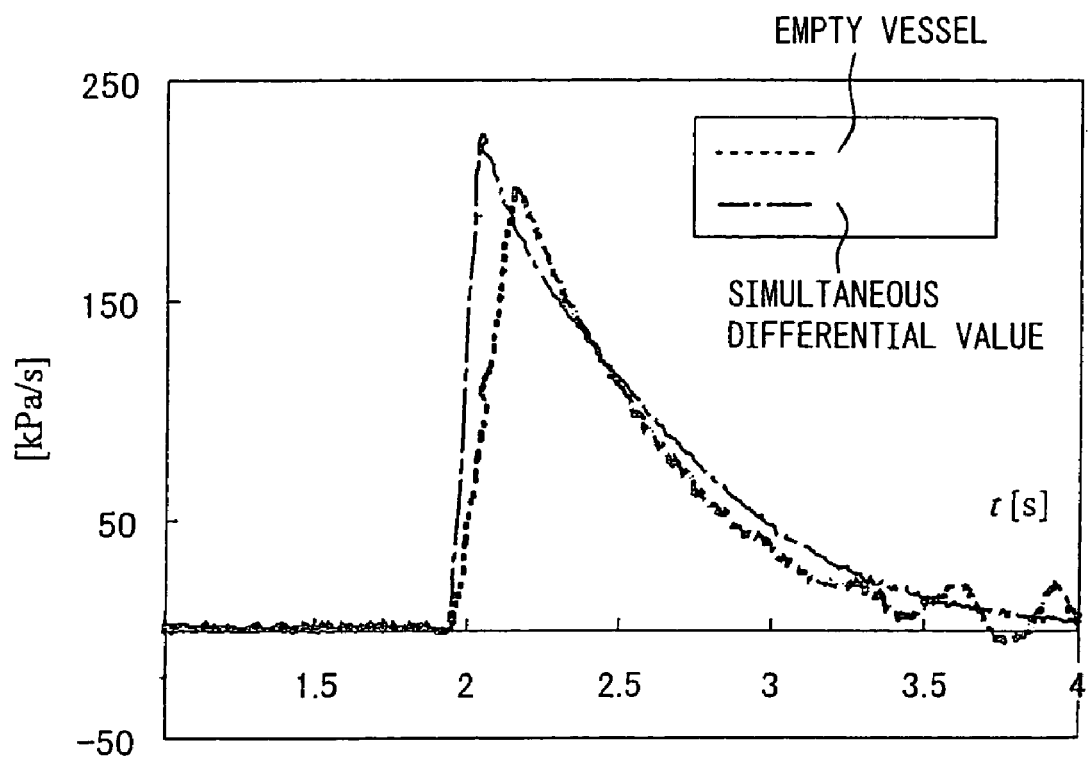
FIG. 8 is a graph indicating an experimental result of the pressure differentiator with the empty vessel and indicating the simultaneous differentiation value of the pressure $P_s$.

FIG. 8 is an enlarged diagram including a peak value of the pressure in FIG. 7. Apparent from FIG. 8, the peak value when the empty vessel was used was 195 kPa/s, on the other hand, the peak value obtained by simultaneous differentiation of $P_s$ was 220 kPa/s. Obviously, this difference of 25 kPa/s between them was a significant difference. Further, time of the peak value in the case of the empty vessel was somewhat delayed in comparison to that in case (2).

By the above results, the effectiveness of the pressure differentiator with the isothermal pressure vessel is confirmed.

The results are as below.

In the proposed pressure differentiator of the invention, the differential value of the pressure $P_s$ to be measured could be measured, without delay of the phase, as well as the differential pressure value obtained by simultaneous differentiation of the output signal of the manometer.

Further, from the result in which the output of the proposed pressure differentiator was compared to the output signal of the pressure differentiator with the empty vessel having no copper wire therein, the output gain in the latter case was decreased as the pressure inside the vessel was reduced and the phase delay occurred. On the other hand, such a problem was not observed in the proposed pressure differentiator.

Therefore, according to the best mode for carrying out the present invention, the pressure differentiator includes a vessel, a hollow channel for connecting an object to be measured to the inside of the vessel, and a differential manometer for calculating a differential pressure between the object and the inside of the vessel. Therefore, an accuracy of measurement may be improved.

As the pressure differentiator may directly and accurately measure the derivative value of the pressure, the pressure differentiator may be used for improving the performance of a pneumatic control system or an air-conditioning control system in a chemical laboratory. Further, the pressure differentiator is available for measuring an unsteady flow rate of air.

The derivative value [Pa/s] of the pressure corresponds to a jerk value or a derivative value of an acceleration. Therefore, the derivative value is important for controlling the pneumatic system. As the value may be directly measured by the invention, the performance of the control may be improved. This is also possible when an environmental change is to be measured.

The invention should not be limited to the above best mode and, therefore, it should be apparent that numerous modifications could be made thereto, without departing from the basic concept and scope of the invention.

CITED REFERENCES

1) K. Sudo, T. Hasegawa, M. Shirakashi: Dynamics of Fluid, Corona Publishing Co., Ltd (1994)

2) T. Kagawa, M. Shimizu: Dimensionless Pressure Response Considering Heat Transfer of Pneumatic Resistor Capacitor System, Hydraulics and Pneumatics, (1988)

3) M. Yasuda: Active Micro-vibratory Control by Pneumatic Pressure, Journal of the Japan Hydraulics and Pneumatics Society (JHPS), Vol. 31, No. 5, pp. 14-19, (2000)

The invention claimed is:

1. A pressure differentiator, comprising
a vessel;
a hollow channel for connecting an object to be measured to the inside of the vessel, the hollow channel being configured such that the pressure within the vessel is changed with a lag through the hollow channel when the pressure of the object is changed; and
a differential manometer for measuring a differential pressure between the object and the inside of the vessel, in order to calculate the derivative value of the pressure of the object by using the measured differential pressure and the lag.

2. The pressure differentiator as set forth in claim 1, wherein a flow through the hollow channel during measurement is a laminar flow.

3. The pressure differentiator as set forth in claim 1, wherein the differential manometer is a diaphragm type differential manometer.

4. The pressure differentiator as set forth in claim 1, wherein the volume of the vessel is $1.0 \times 10^{-8}$ to $1.0 \times 10^{-4}$ m$^3$.

5. The pressure differentiator as set forth in claim 1, wherein the inner radius of the hollow channel is 0.00001 to 0.001 m.

6. The pressure differentiator as set forth in claim 1, wherein the length of the hollow channel is 20 to 500 mm.

7. The pressure differentiator as set forth in claim 1, wherein the vessel is an isothermal pressure vessel.

8. The pressure differentiator as set forth in claim 7, wherein the vessel is fitted with a temperature equalizing material.

9. The pressure differentiator as set forth in claim 8, wherein the temperature equalizing material is thin metal wires.

10. The pressure differentiator as set forth in claim 1, wherein the object to be measured is a gas.

11. The pressure differentiator as set forth in claim 1, wherein the lag corresponds to a response time constant.

12. A method for calculating a derivative value of the pressure of an object to be measured, comprising
connecting the object to the inside of a vessel by a hollow channel configured such that the pressure within the vessel is changed with a lag through the hollow channel when the pressure of the object is changed; and
measuring a differential pressure between the object and the inside of the vessel by a differential manometer, and calculating the derivative value of the pressure of the object by using the measured differential pressure and the lag.

13. A method according to claim 12, wherein the object is a gas.

14. A method according to claim 12, wherein the object is nitrogen, hydrogen or carbon dioxide.

15. A method according to claim 12, wherein the object is air.

16. The method as set forth in claim 12, wherein the lag corresponds to a response time constant.

* * * * *